United States Patent [19]

François et al.

[11] Patent Number: 4,503,670
[45] Date of Patent: Mar. 12, 1985

[54] DECELERATION LIMITER, PARTICULARLY FOR A TURBINE ENGINE

[75] Inventors: Yves-Marie M. R. François, Dammarie les Lys; Jean-Claude Vergnes, Le Mee sur Seine, both of France

[73] Assignee: S.N.E.C.M.A., Paris, France

[21] Appl. No.: 396,284

[22] Filed: Jul. 8, 1982

[30] Foreign Application Priority Data

Jul. 8, 1981 [FR] France .................. 81 13383

[51] Int. Cl.³ .............................................. F02C 9/00
[52] U.S. Cl. ................................. 60/39.281; 74/470
[58] Field of Search ................. 60/39.281; 267/8 R; 74/470, 501.5

[56] References Cited

U.S. PATENT DOCUMENTS

| | | | |
|---|---|---|---|
| 2,688,884 | 9/1954 | Warmoes et al. | 74/470 |
| 3,110,229 | 11/1963 | Farkas | 91/443 |
| 3,225,814 | 12/1965 | Capwell | 60/243 |
| 3,596,466 | 8/1971 | Anschutz | 60/39.281 |
| 3,727,480 | 4/1973 | Need | 74/470 |
| 4,323,356 | 4/1982 | Stephenson | 440/86 |

FOREIGN PATENT DOCUMENTS

| | | |
|---|---|---|
| 1379530 | 10/1964 | France . |
| 2005028 | 3/1969 | France . |
| 612425 | 11/1948 | United Kingdom . |
| 639987 | 7/1950 | United Kingdom . |
| 1228151 | 4/1971 | United Kingdom . |

Primary Examiner—Louis J. Casaregola
Attorney, Agent, or Firm—Oblon, Fisher, Spivak, McClelland & Maier

[57] ABSTRACT

The invention relates to a deceleration limiter for a turbine engine. Through a rotary cam and a compressed spring, the throttle lever acts on a regulator for the fuel injector, for instance on the beam of a tachometric scale. According to the invention, the piston of a hydraulic damper and a push rod are interposed between the spring and the periphery of the cam. The chamber is connected to a source of ambient fluid under pressure p, which also acts on the other side of, through a damper valve which enables only the fluid to penetrate into, and by a diaphragm. The invention applies particularly to turbojet regulators to limit the magnitude and speed of development of the system parameters controlling the operation of the turbine engine following an abrupt deceleration command initiated by the pilot.

5 Claims, 3 Drawing Figures

DECELERATION LIMITER, PARTICULARLY FOR A TURBINE ENGINE

BACKGROUND OF THE INVENTION

1. Field of the Invention

This invention relates to a deceleration limiter, particularly for a turbine engine.

2. Description of the Prior Art

It is known that the fuel metering valve of a turbine engine is normally controlled using a throttle lever which acts on a fuel controller, various conventional embodiments of which exist. This fuel controller may be, for instance, a speed sensor balance, the beam balance of which is affected by various control elements which act on both of its arms. Most of these control elements receive input data originating from sensors which detect various operating parameters of the turbine engine. The throttle lever acts either directly or indirectly on the speed sensor balance beam through a compressed elastic element, such as a spring.

It is also known that the operating conditions of a turbine engine are governed by the fuel mixture richness, which varies in the same way as the ratio (C/P) of the fuel flow (C) emitted by the injector at a specific pressure (P), to the flow of air traversing the combustion chamber, specifically at the compression pressure (P2) of the compressor. In particular, the specific ratio (C/P) must not fall below a set minimum, to avoid risks of extinction of combustion in the combustion chamber due to a lean mixture.

For this reason, the fuel controller which acts on the fuel metering valve is normally equipped with a special device, designated by the name of "deceleration stop," the function which is illustrated in FIG. 1. This diagram shows the variations of the specific ratio (C/P) as a function of the rotation speed (N) of the turbine under various operating conditions. Curve S corresponds to steady operation of the turbine engine, for instance, at a fixed load and at uniform cruising speed in the case of a turbojet installed in an airplane. Curve Li corresponds to the lower limits imposed on the specific ratio (C/P) by the deceleration stop device, whereas curve Ls corresponds to the upper limits imposed on the C/P ratio by an acceleration stop device.

FIG. 2 shows, in the same plane of coordinates as FIG. 1, a solid curve (P) corresponding to abrupt deceleration which, when the pilot abruptly activates the throttle lever in the corresponding direction, causes the operating point of the turbine engine to move from point A to point B of its steady operation curve (S). Curve P in the FIG. 2 diagram clearly illustrates that although fuel controllers used prior to the present do perform the so-called "deceleration stop" function corresponding to the Li curve, they do not prevent a very sudden and very rapid decrease of the specific ratio (C/P), and, subsequently of the flow (C) of fuel emitted by the metering valve to the turbine engine. It is apparent, and it has in fact been noted, that decreases of such speed and magnitude of the fuel flow subject the turbine engine to extremely abrupt changes in operating conditions which translate particularly into thermal shocks which sometimes result in damage to the turbine engine and, in any case, substantially reduce the longevity of its various parts.

U.S. Pat. No. 3,596,466 to Anschutz et al. discloses a fuel controller for a turbine engine fuel fuel metering valve, wherein the fuel metering valve itself is controlled by a valve, which in turn receives, from a mechanical device, a signal proportional to the square root of the specific ratio (C/P). This prior art device is therefore complex which, in the technology under consideration, causes inconveniences in terms of reliability and maintenance.

U.S. Pat. No. 3,513,899 Paduch also discloses a fuel controller which acts on a turbine engine fuel metering valve through a step-up gear. In case of maximum deceleration, the action of the throttle lever on this gear is limited by an extremely complex gearing system, which comes to rest against a three-dimensional cam which defines the rate of variation of the specific ratio (C/P) during deceleration. This three-dimensional cam moves axially as a function of the turbine engine compressor speed, while its angle is affected by the temperature at the compressor inlet. Again, the complexity of this device is unsatisfactory in terms of reliability and maintenance.

SUMMARY OF THE INVENTION

The deceleration limiter, particularly for a turbine engine, according to the present invention, displays the advantage of great simplicity, which ensures very high reliability and high longevity. The deceleration limiter according to the present invention is designed for a turbine engine, the fuel injector of which is controlled using a throttle lever which acts on a fuel controller such as a speed sensor balance through a compressed elastic element such as a spring. The free piston of a hydraulic damper and a push rod are interposed between the compressed elastic element and a cam controlled by the throttle lever, an ambient fluid acts on the same side of the piston as the elastic element, and the damper chamber into which the push rod penetrates in a sealed manner connects with said ambient fluid through, on the one hand, a damper valve enabling only the ambient fluid to enter said damper chamber and, on the other hand, an appropriate diaphragm.

In a preferred embodiment of the deceleration limiter according to this invention, the push rod, which is in the form of a hollow cylinder, is kept in almost permanent contact by its base external to the damper, with the periphery of a cam, for instance a rotary cam, coupled to the throttle lever by the action of an elastic element such as a spring, which is lodged inside the hollow cylindrical push rod, in such a way that it is compressed between, on the one hand, its base in contact with the cam and, on the other hand, an extension of the damper piston, which penetrates into the hollow push rod through an orifice in its other base. Preferably, the damper piston extension which penetrates into the hollow pushrod comprises a stop element, positioned in such a way that it interacts with the base of the push rod to provide a limit of the spread between the piston and the push rod in the case of abrupt deceleration of high magnitude by temporarily separating the push rod from the cam. This embodiment is especially advantageous in that it limits not only the abruptness of decleration, but also the magnitude of deceleration.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 2:
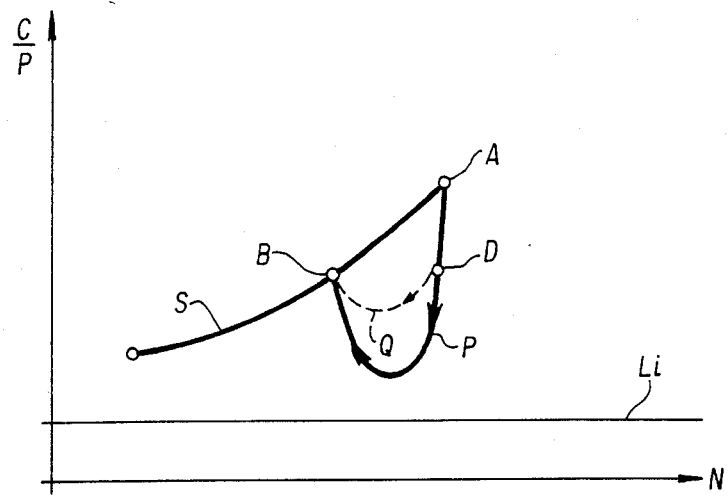
FIGS. 1 and 2, are diagrams illustrating the operation of a turbine engine.

The turbine engine regulator, used with the invention may be of the following conventional type, provided as a non-limiting example. This regulator is a speed sensor balance of conventional type, including a beam having two arms (1a and 1b) which move freely around an axis (2). This beam is in equilibrium during steady operation, under the following forces applied to it: a force F1 (upward in FIG. 3) is applied at a fixed point of the 1a arm, via a spring (3), from a rotary cam (4), coupled to the throttle lever (not shown). In the conventional tachometric scale, the periphery of the rotary cam (4) acts directly on spring 3, with a metal plate interposed therebetween. A force F2 is also applied to a fixed point of arm 1a of the beam, opposed to F1, that is downward and is, produced by a compressed spring (5). A downward force is produced by a compressed spring (6), and is applied at point M of arm 1b of the beam. The distance of point M a from axis (2) changes as a function of the rotation speed (N) of the turbine engine, via a linkage (7) supporting at its extremity a roller (8) interposed between arm 1b of the beam and a mobile plate (9) on which the end of compressed spring 6 presses. A downward force F4 is produced by an electric motor (10) which is controlled by an electric error signal produced by a computer (not shown) which is part of the turbine engine fuel controller. An upward force F5 is applied at a fixed point of arm 1b of the beam, by the shaft (11a) of an actuator (11), via a compressed spring (12). Chambers 11b and 11c of the actuator (11) receive a control fluid. Chamber 11b receives the control fluid at a control pressure, and chamber 11c receives the control fluid via restriction 12a. The control fluid which fills the chamber 11c additionally supplies a nozzle (13), which, when not completely shut by the end of arm 1b of the lever, aims a jet of pressurized fluid against arm 1b, which applies an upward force F6 to a fixed point of said arm 1b. The shaft (11a) of the actuator (11) is coupled by a rotary arm (14) to the control axis (15) of the fuel metering valve (not shown) of the turbine engine; in other words, the value of the specific ratio C/P is set by the angle of parts 14 and 15 and, consequently, by the position of piston 11d of the actuator (11).

The beam of this speed sensor balance is thus maintained in equilibrium through the combined action of forces F2, F3 and F1 which correspond, respectively, to the fuel controller input size, the speed N of the turbine engine, and the angle of the throttle lever, as well as the corrective force F4 and forces F5 and F6, produced at two separate points of the loop of a servosystem, the motion of the motor element (11) of which produces the output magnitude of C/P.

According to this invention, the free piston, 16a, of a hydraulic damper 16 is interposed between the compressed spring (3) and a push rod (17), controlled by the rotary cam (4) coupled to the throttle lever; chamber 16b of damper 16, in which push rod 17 penetrates in a sealed manner through an orifice 18 on the side of the damper cylinder (16) opposite its piston (16a), is connected to a source of ambient fluid, for instance a non-compressible fluid, under pressure p, through, on the one hand, a one way valve (20) enabling the ambient fluid only to enter said chamber (16b) of the damper and, on the other hand, a restriction (19).

It can be seen that in the embodiment shown, the device as a whole is subject to the ambient fluid under pressure p, and pressure p is within cylinders 16 and 17 and, in a general manner, prevails in the entire regulator body. The ambient fluid also fills the other chamber 16c, open at the top, of damper 16. The surface of piston 16a which is opposite the chamber 16b is thus permanently subjected to pressure p, as well as to the action of compressed spring 3.

Figure 3:
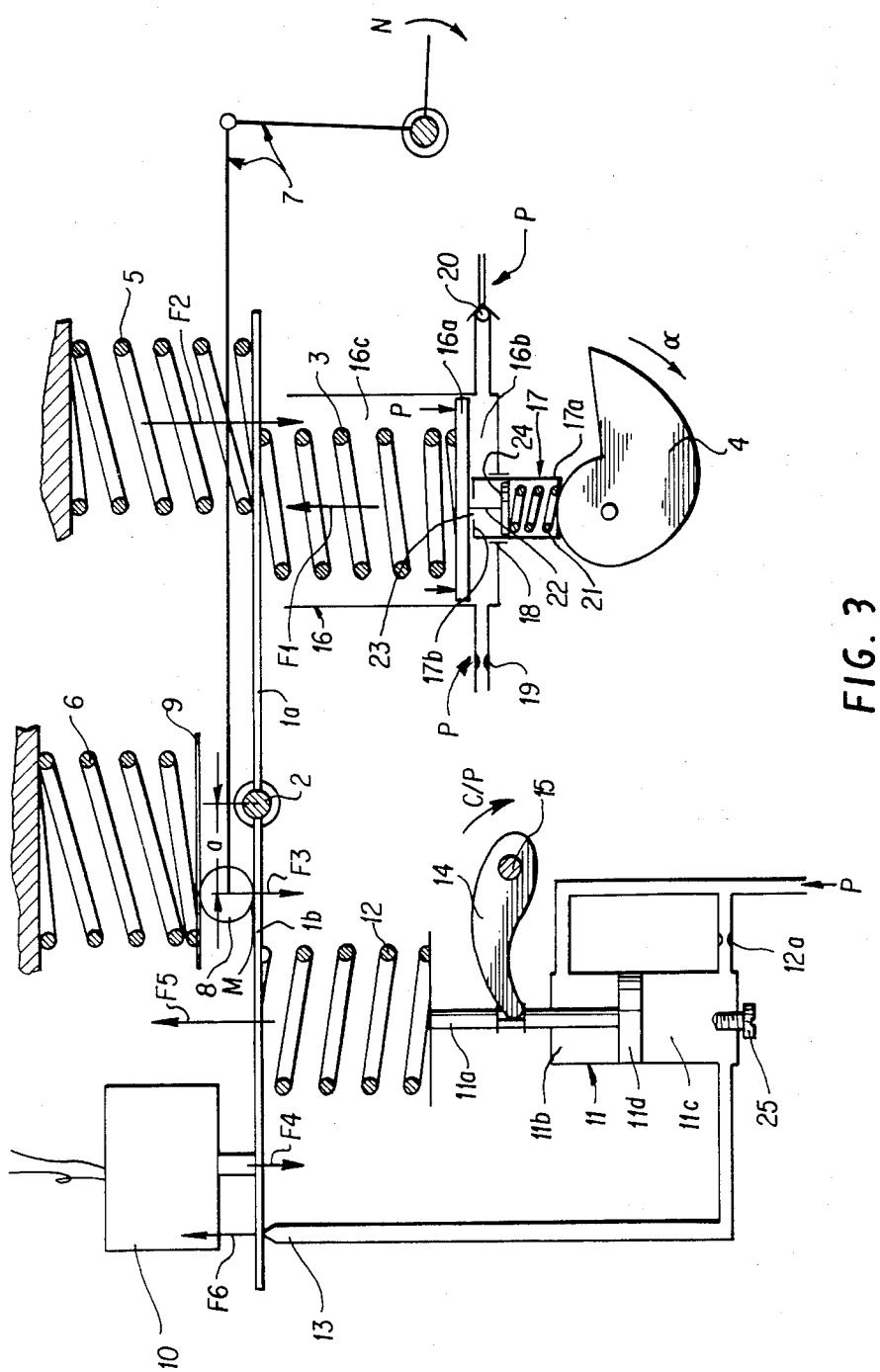
FIG. 3 is a schematic drawing of the preferred embodiment of the invention.

On the other hand, push rod 17 is in the form of a hollow cylinder and, through its base (17a) which is external to damper 16, it is kept in almost permanent contact with the periphery of rotary cam 4 by the action of a spring (21) housed inside the hollow push rod (17) in such a way that it is compressed between base (17a) on the one hand and an extension 22 of piston 16a of damper 16 on the other hand, this extension (22) penetrating into the hollow push rod (17) through an orifice (23) in its other base (17b). In addition, in the embodiment, the preferred extension (22) of piston 16a of damper 16, which penetrates into hollow push rod 17, includes a stop element (24) positioned so that it limits the separation piston 16a and push rod 17, as will be explained below. As shown in FIG. 3, this stop element (24) is in the form of a plate affixed perpendicular to the extension (22), so as to act as a prop for the compressed spring (21).

The positions of the various elements shown in FIG. 3 correspond to a point of steady operation of the turbine engine (for instance, B on the FIG. 2 diagram). As the rotary cam (4) is moved by an angle determined by the position of the throttle lever, it applies a specific force F1 to arm 1a of the speed sensor balance beam, through the parts 17, 16a and 3, kept in contact with one another by the action of compressed spring 3 and the reaction of lever arm 1a. Indeed, in this situation, and regardless of speed indicated, any manoeuver except abrupt, high-magnitude deceleration during which the device according to invention comes into (operation), base 17b of push rod 17 presses against piston 16a and spring 21 provides less force than force F1 provided by spring 3.

If the pilot moves the throttle lever in the direction corresponding to acceleration, this causes cam 4 to rotate in a clockwise direction, the periphery of said cam pushing parts 17 and 16a, which remain in contact with one another on base 17b of push rod 17, in the direction of arm 1a of the beam. Force F1, which is transmitted by compressed spring 3, subsequently increases, which tends to cause the beam to pivot around its axis (2) in a counterclockwise direction (in FIG. 3). Arm 1b of the beam thus moves to shut nozzle 13, which produces an increase in the pressure prevailing in chamber 11c of actuator 11, the piston 11d of which lifts. The result is a pivoting of the control axis (15) of the fuel injector in a clockwise direction corresponding to an increase in fuel flow (C) followed by an increase in speed (N) and to a corresponding movement of roller 8 the other hand. Moreover there is an increase in force F5 which shaft 11a of actuator 11 applies to arm 1b of the beam through the spring (12), the effect of which is to return said beam to its initial equilibrium position. The device according to this invention, which includes elements 16, 17, 19, 20, 21, 22 does not affect the development of such an acceleration phase, insofar as there does not cease to exist to be a connection between elements 4, 17 and 16a, cams 4 and push rod 17, on the one hand, remain in contact and base 17b of push rod 17 rests on piston 16a on the other hand. Of course, during the ascending synchronous movement of push rod 17 and piston 16a of damper 16, the prevailing pressure in its chamber (16b) is maintained substantially equal to p, despite the continuous increase of the volume of said chamber 16b, by the opening of the damper valve (20) which thus allows appropriate quantities of fluid at pressure p to enter said chamber.

When, starting from a steady position corresponding to point A on FIG. 2 which is reached, for instance, during the acceleration described in the above paragraph, the turbine engine pilot activates the throttle lever abruptly, causing a corresponding, very sudden deceleration and, more particularly, causing cam 4 to rotate in a counterclockwise direction, push rod 17 descends very quickly in such a way that its base 17a is almost continuously in contact with the periphery of cam 4, because of the extension of spring 21, which presses on piston 16a of damper 16, through parts 22 and 24. This descent of push rod 17 produces an increase in the volume of chamber 16b compensated by a rapid descending movement of piston 16a, caused by the extension of compressed spring 3. The result is a reduction of force F1 and, subsequently, a slight pivoting of the beam in a clockwise direction. As nozzle 13 is thus opened, its pressurized fluid flow increases so that the pressure in chamber 11c of actuator 11 decreases and piston 11d may descend to a lower limit set, for example, by an adjustable stop screw (25). Piston 11d of actuator 11 thus descends while causing the control axis (15) of the fuel injector to rotate in the direction corresponding to a reduction of specific ratio C/P, from which a reduction of speed N and movement of roller 8 in the reverse direction result. At the same time, force F5 transmitted by spring 12 decreases, the effect of which is to return the beam towards its initial equilibrium position. The deceleration curve corresponding to this initial phase is therefore practically the same as the almost vertical drop of curve P (diagram in FIG. 2) from the point of steady operation A. However, the phase of rapid descent of piston 16a of damper 16 ends when the pushrod (17) comes back into contact either with cam 4. The stop element (24); the descending movement of piston 16a of damper 16 then continues through progressive expulsion of fluid out of chamber 16b, through restriction 19, but at a much slower rate imposed by the caliber of said restriction 19. This second phase in the descent of piston 16a subsequent to the first, rapid phase also produces, for reasons mentioned previously, a reduction of the specific ratio (C/P), but at a slower, more progressive rate. Arc Q, shown in dotted lines on the FIG. 2 diagram, corresponds to this second phase of deceleration; on the diagram, it connects a point (D) of the almost vertical drop of curve P to point B of curve S, which corresponds to the new state of stable operation of the turbine engine. Piston 16a of damper 16 has then come back into contact with base 17b of push rod 17 which itself has come back into contact, by its other base (17a) with the periphery of rotary cam 4.

The preceding description shows that the device according to the invention acts only when there is a reduction of force F1 between cam 4 and the beam arm 1a, that is, its inclusion modifies the rate of deceleration.

As clearly illustrated in FIG. 2, substitution of the deceleration curve A, D, Q, B for the normal deceleration curve A, P, B, translates into a reduction of the magnitude of variations of specific ratio C/P and, subsequently, of the fuel flow (C). This reduces the intensity of thermal shocks to which the turbine engine is subjected during sudden deceleration, and thus ensures an increase in the longevity of the various elements of the turbine engine.

Part 24, mentioned above, forms a stop for base 17b of push rod 17 which, during descending movements of the latter, on the one hand, prevents said push rod from leaving chamber 16b of damper 16 and, on the other hand, imposes an upper limit on the spread between elements 16a and 17 and subsequently, on the maximum magnitude of the corresponding variation of flow C.

Figure 1:
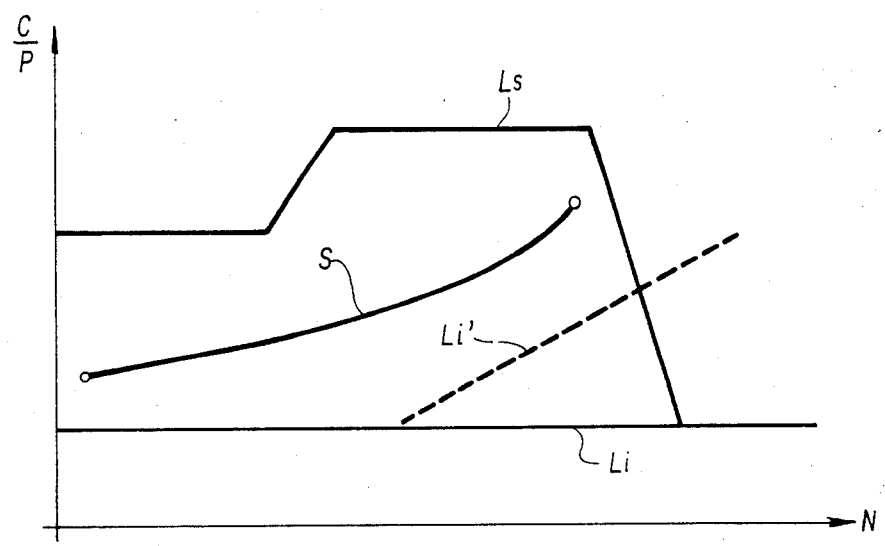

As indicated previously, the electric motor (10) received error signals from the computer. As a function of these signals, motor 10 exerts on the beam of the speed sensor balance only relatively little action compared, for example, to the action produced by the throttle lever. By using the deceleration limiter according to this invention, the following additional advantage is obtained: It becomes possible to install the adjuster motor (10) in such a way that it will exert on the beam actions on the same order of magnitude as those of the throttle lever. Thus, because of the reduction of magnitude of the deceleration curve, which is clearly apparent from FIG. 2, it becomes possible to substitute for the lower limit function represented by the substantially horizontal curve Li in FIG. 1, corresponding to the position of piston 11d pressing against screw 25, a lower limit function comprising an ascending portion (Li'), shown in dotted lines on the same figure, thanks to a greater intensity of actions exerted by motor 10.

This invention is not limited to the embodiment described above. It encompasses all of its variations. The stop element (24) is optional. In case the stop composed of interaction of part 24 and base 17b of push rod 17 is eliminated, the contact becomes permanent between the periphery of the rotary cam (4) on the one hand, and base 17a of push rod 17 on the other hand. There may also be provided a permanent coupling between the end of push rod 17 which is external to damper 16 and cam 4 or an appropriate mechanical transmission element, which is coupled to the throttle lever. As previously indicated, this invention applies not only to a speed sensor balance of conventional type, but to any other fuel controller which is its functional equivalent.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. In a turbine engine having a throttle lever, a fuel metering valve and a fuel controller element connected between said throttle lever and said fuel metering valve, a deceleration limiter comprising:
   a cam movable with said throttle lever;
   a hydraulic damper;
   a free piston forming a first piston in said damper;
   a spring having one end contacting said fuel controller element and a second end contacting one side of said first piston;

a movable push rod extending into said damper and forming a second piston of a smaller diameter than said first piston, one end of said push rod being positioned to contact a second side of said first piston and a second end of said push rod being positioned to contact said cam;

hydraulic fluid in said damper;

a fluid inlet including one way valve means connected to said damper on a first portion corresponding to said second side of said first piston for permitting hydraulic fluid to enter said damper; and a fluid outlet including flow restriction means connected to said first portion of said damper.

2. The deceleration limiter of claim 1 wherein said fuel controller element comprises a speed sensor balance.

3. The deceleration limiter of claim 1 wherein said throttle lever is movable and including means for biasing said push rod into contact with said cam.

4. The deceleration limiter of claim 3 wherein said means for biasing comprises a second spring in said push rod and in contact with an element fixed to said piston.

5. The deceleration limiter of claim 4 wherein said element fixed to said piston includes a stop means for limiting the separation of said piston and said push rod.

* * * * *